United States Patent
Haq et al.

(10) Patent No.: US 12,072,907 B1
(45) Date of Patent: Aug. 27, 2024

(54) GRAPHICAL USER INTERFACE FOR TIME-BASED DATA VISUALIZATION

(71) Applicant: Splunk Inc., San Francisco, CA (US)

(72) Inventors: Nusair Haq, Milton (CA); Ryan O'Connor, Mystic, CT (US); Siegfried Puchbauer, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 144 days.

(21) Appl. No.: 17/707,226

(22) Filed: Mar. 29, 2022

(51) Int. Cl.
*G06F 16/26* (2019.01)
*G06F 3/0487* (2013.01)
*G06F 16/2458* (2019.01)

(52) U.S. Cl.
CPC ............ *G06F 16/26* (2019.01); *G06F 3/0487* (2013.01); *G06F 16/2477* (2019.01)

(58) Field of Classification Search
CPC .... G06F 16/26; G06F 3/0487; G06F 16/2477; G06F 16/248; G06F 3/0482; G06F 3/04842; G06F 16/9538
USPC .......................... 707/722, 725, 736, 754, 769
See application file for complete search history.

(56) References Cited

U.S. PATENT DOCUMENTS

| | | | |
|---|---|---|---|
| 7,937,344 B2 | 5/2011 | Baum et al. | |
| 8,082,504 B1 * | 12/2011 | Tischer | G06F 16/78 715/725 |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 * | 11/2018 | Lamas | G06F 16/2291 |
| 2015/0168144 A1 * | 6/2015 | Barton | G01C 11/02 348/144 |
| 2016/0055446 A1 * | 2/2016 | Sen | G06Q 10/063118 705/7.17 |
| 2017/0093645 A1 * | 3/2017 | Zhong | H04L 41/12 |
| 2019/0098106 A1 | 3/2019 | Mungel et al. | |
| 2020/0111552 A1 * | 4/2020 | Ahmed | G16H 40/67 |
| 2021/0279297 A1 * | 9/2021 | Mallin | G06F 3/048 |
| 2022/0222252 A1 * | 7/2022 | Jha | G06F 11/1471 |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.

(Continued)

*Primary Examiner* — Phong H Nguyen
(74) *Attorney, Agent, or Firm* — Perkins Coie LLP

(57) ABSTRACT

A graphical user interface (GUI) includes multiple data visualizations and an adjustable graphical user control. The data underlying the data visualizations are timestamped, and the graphical user control enables a user to select a time interval. When a time interval is selected or modified via the graphical user control, the multiple data visualizations update automatically in real time to reflect data that correspond to the currently selected time interval.

17 Claims, 7 Drawing Sheets

(56) References Cited

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Splunk COVID-19 Dasboards, available online at: https://covid-19.splunkforgood.com/hub, 1 page, retrieved Mar. 25, 2022.

U.S. Appl. No. 29/800,320, titled "Display Screen or Portion Thereof Having a Graphical User Interface With a Time Slider for a Map" and filed Jul. 20, 2021.

* cited by examiner

400

Cause display of a graphical user interface that includes an adjustable graphical user control for specifying a time interval and a plurality of data visualizations.
402

Receive a user input specifying the time interval via the adjustable graphical user control.
404

Update the plurality of data visualizations in real-time automatically in response to the user input, wherein the plurality of updated data visualizations are generated using data points associated with time values within the time interval.
406

FIG. 4

GRAPHICAL USER INTERFACE FOR TIME-BASED DATA VISUALIZATION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 4 is a flowchart illustrating an example process for displaying a GUI.

DETAILED DESCRIPTION

Figure 1:
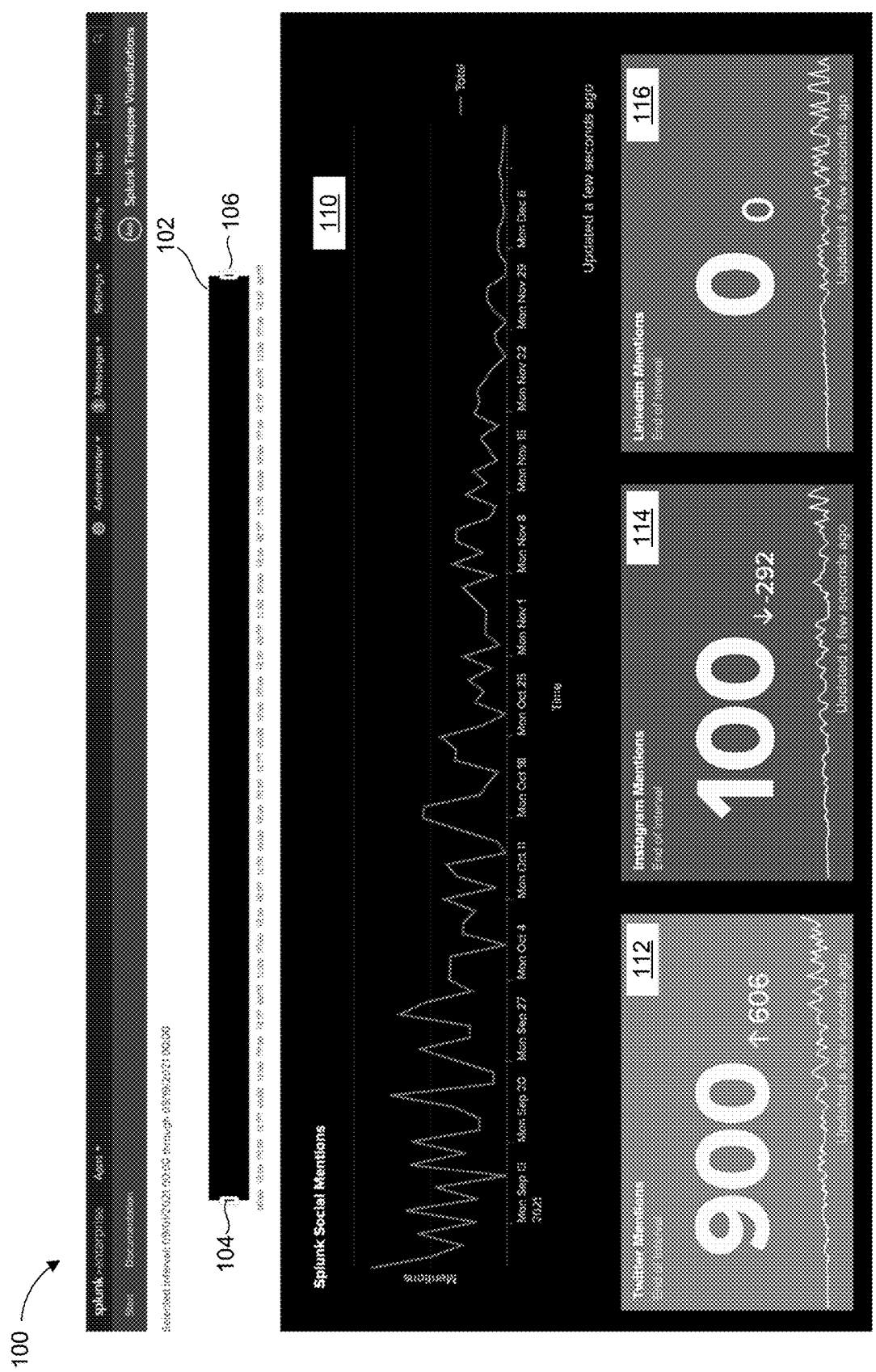
FIG. 1 illustrates an example graphical user interface.

Data visualizations can make large amounts of complex machine data more accessible, understandable, and usable. Examples of data visualizations include tables, pie charts, column charts, time graphs, scalable vector graphics objects, and the like. A good data visualization improves a user's ability to understand and process data, enabling the user to efficiently identify issues (e.g., technical, performance and/or security related issues) and gauge system performance. Some data visualizations are static visualizations, which are limited in that they do not allow a user to interact with the data to guide or focus their analysis. In contrast, an interactive visualization, also called a dynamic visualization, allows a user to modify a visual representation of the data. For example, a user may input a command to change the color, scale, or orientation of a bar graph.

Data visualizations can be included in a graphical user interface (GUI) that enables a user to interact with the data visualizations to gain additional insights. However, current GUIs used for data visualization are limited in their ability to select and display input data. For example, time-stamped data underlying a particular data visualization can span a time range and vary significantly over that time range. A user may want to focus on a more specific time range or other aspect of the data. But to view data visualizations corresponding to different periods of time, the user is often required to modify an underlying data structure or document, such as a spreadsheet, and then rebuild the data visualizations. In addition to offering an unwieldy user experience, the process of modifying the data and rebuilding the data visualization may be computationally intensive.

The technology introduced herein addresses these issues by providing techniques directed to an improved GUI for data visualization (henceforth "the GUI"). The GUI can include a plurality of data visualizations (which may be user-specified/user-selected visualizations) associated with the same set of time-stamped data. The data can include, but is not limited to, time-stamped machine data. The GUI includes an graphical user control that can be adjusted by a user to specify or dynamically modify a time interval of the data to be visualized in the GUI. For example, the graphical user control can include a slider with two control elements associated with a beginning and an endpoint of the time interval, respectively. When the graphical user control is adjusted by the user, the plurality of data visualizations are all automatically and simultaneously updated in real-time to reflect data associated with the specified time interval as modified by the adjustment to the graphical user control.

For example, a data visualization can be created that displays a weekly average of COVID-19 cases over a two-year period. When the user adjusts the graphical user control to specify a three-month period within the total two-year period, the data visualization is automatically updated to display the weekly average of COVID-19 cases over the specified three-month period. Furthermore, other data visualizations displayed in the GUI can also be updated simultaneously with data over the specified three-month period. For instance, a second data visualization can display a total number of COVID-19 cases, and a third data visualization can display a weekly average of COVID-19 hospitalizations, where all three COVID-19 data visualizations are automatically updated in response to adjustments to the graphical user control. Including the graphical user control in the GUI improves the user interface by enabling the user to modify the displayed data visualizations in real-time without the need to modify an underlying data file or to rebuild the data visualizations.

In some implementations, the GUI and the graphical user control are pre-configured based on a pre-selected (default) range of data, after which the GUI including the graphical user control and the plurality of data visualizations are rendered on the user's device. For example, the user can specify a particular year, such as 2021. In this example, when the GUI is generated, data is retrieved whose timestamps fall within 2021, and the data visualizations are limited to the retrieved data from 2021. Then for a graphical user control that is a slider, for example, the entire length of the slider is configured to map to the year 2021. Preconfiguring the GUI in this manner provides several advantages. First, there is an efficient use of computing and network resources because only data within the pre-selected range is loaded rather than an overly large dataset. Second, by loading the entire pre-selected range when generating the GUI, the data visualizations can be quickly updated in real-time without waiting to download additional data as the graphical user control is adjusted.

FIG. 1 illustrates an example graphical user interface (GUI) 100. The GUI 100 is displayed on a user's computing device, such as a laptop, tablet, or smartphone. The GUI 100 includes multiple data visualizations 110-116 which are graphical representations of data or analysis performed on the data. The data visualizations 110-116 can use data from the same data set, from different data sets, or any combination thereof. For example, the data visualization 112 shown in FIG. 1 displays a number of Twitter® mentions "900" and a change in the number of mentions "606." Similarly, the data visualization 114 is based on Instagram® mentions, and the data visualization 116 is based on LinkedIn® mentions. The data visualization 110 is based on a total number of social media mentions, which includes at least the social media networks referenced in the data visualizations 112-116.

As shown in FIG. 1, the data visualization 110 is a line graph, and the data visualizations 112-116 are single value visualizations. The term "single value visualization" refers to a data visualization that comprises a single metric and can additionally include context for the metric. For example, the single metric can be a numerical value, such as the value "900" in the data visualization 112 or the value "100" in the data visualization 114. The context accompanying the metric can include gauges, trendlines, or other numerical information. For example, the data visualization 112 shows a simplified line graph and the number "606" that indicates a trend in the data. Other example data visualizations displayable in the GUI 100 include area charts, bar charts, bubble charts, choropleth maps, column charts, filler gauges, link graphs, marker gauges, multi-dimensional line graphs, pie charts, punch card visualizations, radial charts, Sankey diagrams, scatterplots, tables, scalable vector graphics objects, uploaded images, etc. The data visualizations can include a variety of shapes, such as rectangles, ellipses, etc.

The GUI 100 includes a graphical user control 102 that includes a first control element 104 and a second control element 106. The first control element 104 and the second control element 106 can be selected and moved by user input, i.e., by a user operating any conventional user input device, such as a mouse, trackball, or touchscreen. For example, the user can tap, click, or press on the control element 104 or 106 and then drag or slide the control element 104 or 106. The first control element 104 and the second control element 106 can be moved or positioned to specify a time interval or range. For example, the first control element 104 can be moved to specify the beginning of the time interval, and the second control element 106 can be moved to specify the end of the time interval, where positions of the control elements 104 and 106 correspond to specific points in time. As shown in FIG. 1, the first control element 104 indicates that the selected interval begins Sep. 1, 2021, and the second control element 106 indicates that the selected interval ends at Sep. 19, 2021. After selecting the time interval, the control elements 104 and 106 can be further adjusted to adjust the time interval.

In some implementations, the graphical user control 102 is configured with an initial or default time range. The initial time range can correspond to the largest selectable time range by the graphical user control 102. For example, the first control element 104 can be positioned at a left-most position by default, and the second control element 106 can be positioned at a right-most position by default. The user can then narrow the time range from the initial time range by moving the control elements 104 and 106 toward each other. Once narrowed, the user can then expand the time range, but not beyond the initial time range if the initial time range is configured as the maximum selectable range.

In some implementations, the data underlying the data visualizations 110-116 is retrieved by executing a search. A separate search can be executed for each of the data visualizations 110-116, for example if the data visualizations 110-116 use different sets of data. In some cases, separate searches may not be needed. The search can return a dataset with timestamps that match or exceed the time range covered by the graphical user control 102, after which the data visualizations 110-116 are generated. The data underlying the data visualizations 110-116 include a field containing a timestamp. Then, when a user the provides an input to the graphical user control 102, the data visualizations 110-116 can be updated by filtering the dataset according to the timestamp field. There is no need to perform additional searches because the relevant range of data has already been searched, thereby saving network and computing resources. The searches can be performed by a search system, such as the search system 560 described with reference to FIG. 5 below.

When the time interval is changed using the graphical user control 102, one or more of the data visualizations 110-116 are updated to reflect data with timestamps within the adjusted time interval. For example, the data visualization 112 displays a number of Twitter® mentions within the selected time interval. A user can update the time interval by moving the control elements 104 or 106, and the number displayed in the data visualization 112 dynamically updates as the time interval is changed to reflect the number of mentions within the updated interval. For example, shortening the distance between the control elements 104 and 106 can cause the displayed number of mentions in the data visualization 112 to decrease as data points outside the interval are excluded. The data visualizations 114 and 116 are similarly caused to update automatically in response to changes in the time interval by use of the graphical user control 102. In contrast, in at least some implementations, the data visualization 110 is configured to display data independently of the graphical user control 102. In other implementations, however, the data visualization 110 can be configured to update in response to the graphical user control 102. For example, the range of the time axis of the data visualization 110 can correspond to the time interval selected using the graphical user control 102.

The example graphical user control 102 shown in FIG. 1 is a linear slider. In other implementations, the graphical user control 102 can include toggles, buttons, drop-downs, scrollbars, dials, etc. The graphical user control 102 or the control elements 104 or 106 can be configured according to various considerations, such as a desired size, shape, or precision of the graphical user control 102. For example, a graphical user control 102 such as a linear slider can be configured to have a time scale with a granularity that matches that of the timestamped data. In some cases, the slider can be configured with a time scale that has coarser granularity than that of the timestamped data, which makes it easier for a user to select certain values. For example, the control elements 104 or 106 can be configured to "snap" to fixed time values (e.g., 1:00, 2:00, etc.) when a user selects a time within a threshold distance from the fixed times. In addition, the graphical user control 102 can be configured to correspond to a set time range. For instance, the graphical user control 102 is configured such that its entire length corresponds to the dates Sep. 1, 2021 to Sep. 19, 2021. Further detail regarding the configuration of the graphical user control 102 is discussed below.

Figure 2:
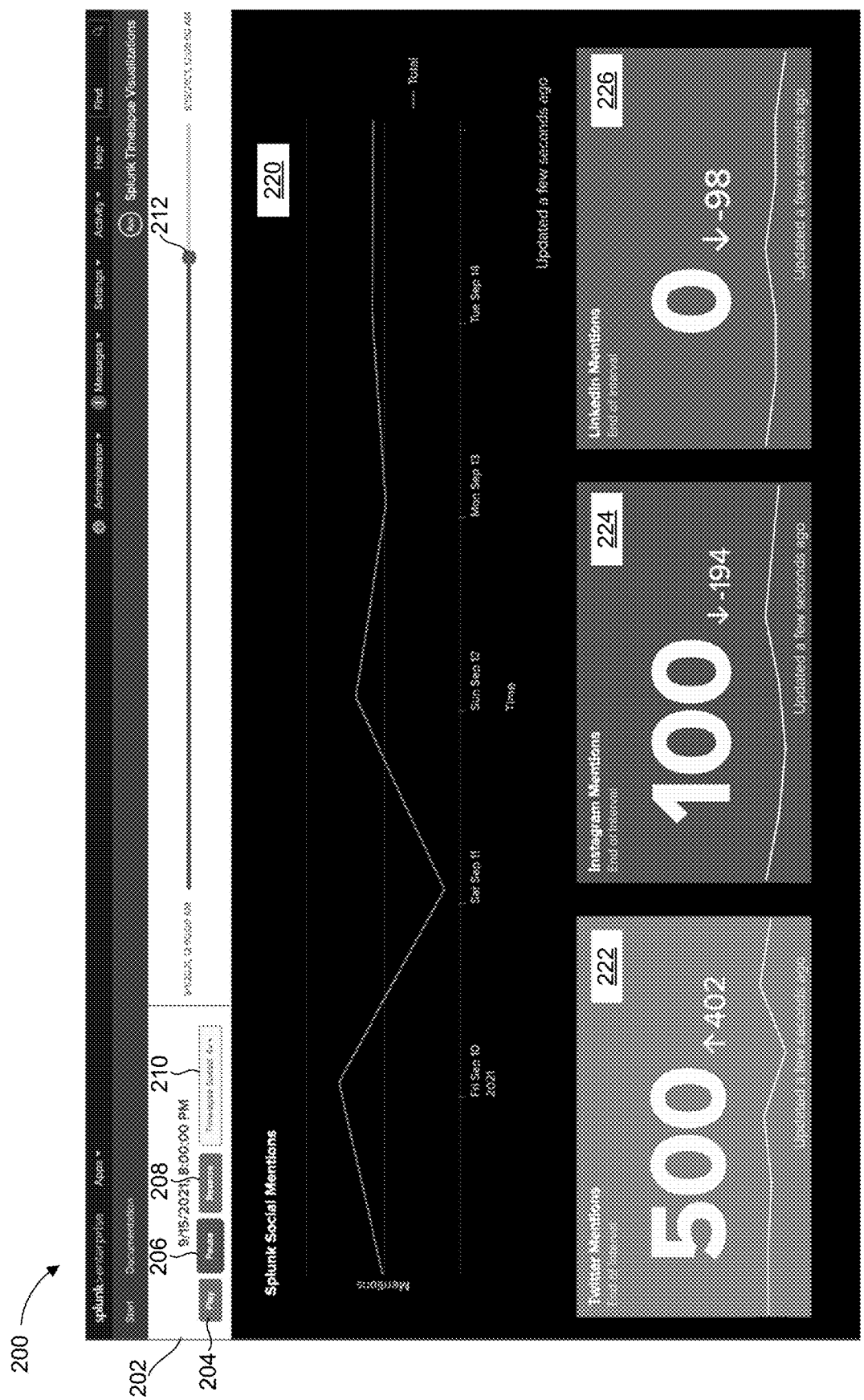
FIG. 2 illustrates an example GUI including a graphical user control with a playback element.

FIG. 2 illustrates an example GUI 200 including a graphical user control 202 with a playback element 204. The GUI 200 includes multiple data visualizations 220-226. The data visualizations 220-226 can be similar to the data visualizations 110-116 shown in FIG. 1.

When an input is received at the playback element 204, a time-lapse can be displayed of the data visualizations 220-226. During time-lapse display, a time interval is repeatedly updated based on a frame rate, and the subset of data being used to display the data visualizations 220-226 is updated using the updated time interval. For example, an hour can be added to the time interval for each update during time-lapse playback. As a result, display of the data visualizations 220-226 can correspondingly update using data within each updated time interval. The sliding element 212 moves as the time-lapse playback executes. As an example, the graph shown in data visualization 220 expands along the time axis during time-lapse playback. Meanwhile, the data visualization 222 that displays the total number of Twitter® mentions in the interval increases according to the data and the frame rate.

In some implementations, the graphical user control 202 can include more than one sliding element 212, similar to the control elements 104 and 106 of FIG. 1. For example, as currently shown in FIG. 2, the sliding element 212 indicates a current endpoint of a time interval, similar to the control element 106 shown in FIG. 1. However, the beginning of the time interval is fixed and indicated by the date, "9/1/2021." Thus, the graphical user control 202 can include an additional sliding element that indicates the beginning of the time interval, similar to the control element 104 of FIG. 1. A two sliding element configuration allows a user to further customize the range of data being visualized or played back.

The graphical user control can include a pause element 206 configured to pause the time-lapse playback. The reverse playback element 208 enables reverse time-lapse playback, meaning that playback progresses backwards in time. For instance, the endpoint value of a time interval reflected in the data visualizations 220-226 can decrease at a certain frame rate, and the data visualizations 220-226 can be updated accordingly. The speed element 210 can be used to configure how the playback speed, or how quickly the time-lapse playback proceeds as displayed on the GUI. The playback speed can be independent of the "frame rate," which denotes how the time range used to select data changes during playback. For example, the playback speed can be "2 updates per second," while the frame rate can be "hour" or "day." In some implementations, the speed element 210 can be used to specify a multiplier, where the playback speed is a product of the multiplier and a previously configured base speed. For example, the speed element 210 in FIG. 2 indicates "Timelapse Speed: 4×."

Figure 3:
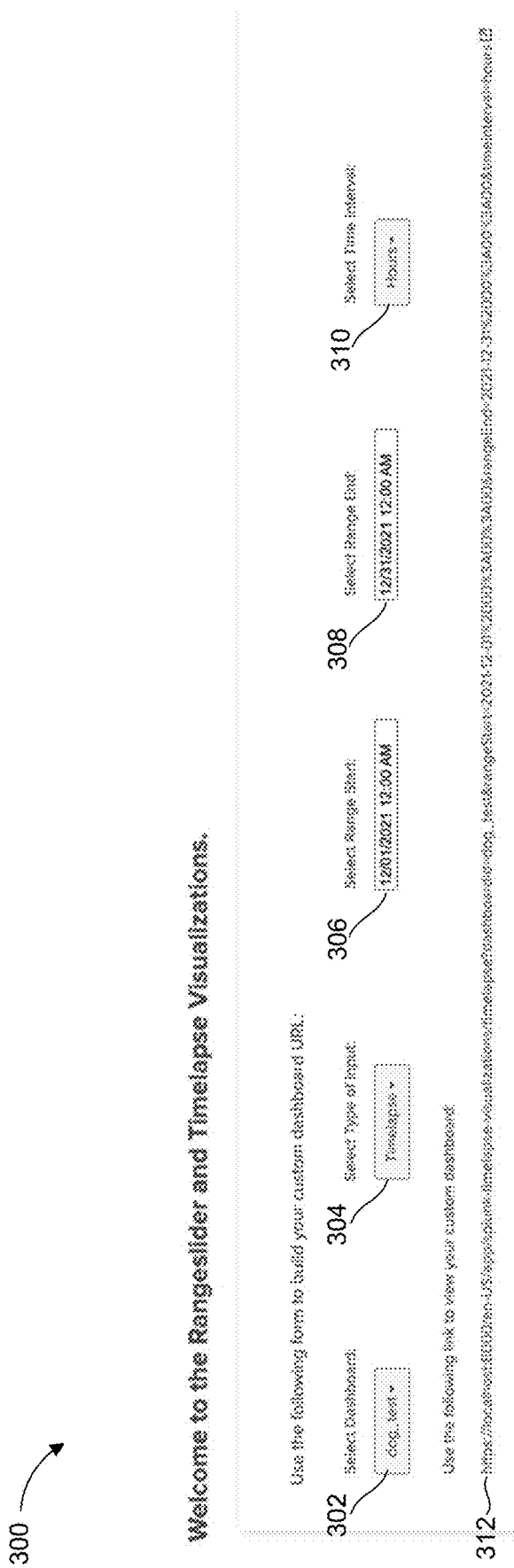
FIG. 3 illustrates a displayable electronic form that can be used to configure a GUI including a graphical user control.

FIG. 3 illustrates a displayable electronic form 300 that can be used to configure a GUI including a graphical user control. For instance, the form 300 can be used to configure various properties of the GUI 100 of FIG. 1 or the GUI 200 of FIG. 2. In some implementations, a user can select from various preconfigured dashboards using a dashboard selection field 302. These preconfigured dashboards are displayed as GUIs including one or more data visualizations that are associated with pre-saved searches. A type field 304 can used to select between a GUI with time-lapse controls such as the GUI 200 of FIG. 2, and a GUI without time-lapse controls, such as the GUI 100 of FIG. 1.

A range start field 306 and a range end field 308 can be used to configure the time range that is adjustable using a graphical user control. For example, the value provided in the range start field 306 can correspond to the earliest timestamp selectable by the first control element 104 in FIG. 1, and the value provided in the range end field 308 can correspond to the latest timestamp selectable by the second control element 106. In some cases, the values in the fields 306 or 308 do not correspond to a control element. For example, the GUI 200 in FIG. 2 does not include two control elements for selecting a time interval but can be configured using the form 300. In the example of GUI 200, the value in the range start field 306 can correspond to an earliest starting point for time lapse playback. If a value in either of the field 306 or 308 is not entered, then the GUI can be configured using a default value, such as the first timestamp value of the dataset.

In some implementations, the size, shape, and/or other visual attributes of the graphical user control 102 can be configured with the form 300. For example, a larger graphical user control 102 may be needed if a difference in between the values in the range end field 308 and the range start field 306 is large. In some implementations, the form 300 can include additional fields associated with various attributes.

The time interval field 310 can indicate the time interval between updates to data visualizations during time lapse playback, also referred to as the "frame rate". For example, the value indicated by the timer interval element can be "hours," in which case the data visualizations update at one-hour timestamp intervals during time-lapse playback. Other intervals include "days," "months," "years," etc. In some implementations, the time interval field 310 can be hidden if the user selects a GUI without time-lapse controls in the "type" field 304.

The values in the fields 302-310 can be processed to generate a customized link 312. Opening the link 312 directs a user to a page that displays a GUI configured according to the fields 302-310. For instance, the GUI 200 of FIG. 2 can be generated using the form 300, where the type field 304 indicates "rangeslider," the range start field 306 includes the value "09/01/2021 12:00:00 AM," and the range start field 308 includes the value "09/19/2021 12:00:00 AM." In some implementations, the GUI can be generated using JavaScript, and the link directs a user to a JavaScript file or page including embedded JavaScript code. In some cases, the link can be a public URL so a user can easily share the data visualizations with others.

FIG. 4 is a flowchart illustrating an example process 400 for displaying a GUI. The example process 400 can be implemented, for example, by a computing device that comprises a processor and a non-transitory computer-readable medium. The non-transitory computer readable medium can be storing instructions, execution of which by the processor causes the processor to perform the operations of the illustrated process 400. Alternatively or additionally, the process 400 can be implemented using a non-transitory computer-readable medium storing instructions, execution of which by one or more processors causes the one or more processors to perform the operations of the process 400 of FIG. 4.

At 402, display is caused of a GUI that includes a plurality of data visualizations and an adjustable graphical user control for specifying a time interval. For example, the GUI can be similar to the GUIs 100 or 200 of FIGS. 1 and 2. The adjustable graphical user control can include a first element that is movable to select a beginning of the time interval and a second element that is movable to select an end of the time interval, for example as shown in FIG. 1. The plurality of data visualizations can include at least one of: a bar chart, a pie chart, a line graph, a scatterplot, a bubble chart, a table, a scalable vector graphics object, or a single value visualization.

At 404, a user input is received via the adjustable graphical user control that specifies the time interval. For example, the input can be received via the first element or the second element. The input can comprise a click, tap, drag, or other user-interaction on the adjustable graphical user control.

At 406, the plurality of data visualizations are updated in real-time automatically in response to the user input from 404. The plurality of data visualizations are generated using data points associated with time values within the specified time interval.

In some implementations, prior to causing display of the GUI at 402, a selection is received that indicates a range start and a range end. For example, the range start and the range end can be indicated using a form similar to the form 300 of FIG. 3. The adjustable graphical user control can be configured based on the range start and the range end, after which it is displayed at 402. In some implementations, a customized link is generated, and GUI is displayed at 402 by accessing the customized link.

The adjustable graphical user control displayed at 402 can include a playback element. When a user input is received via the playback element, a time-lapse display of the plurality of data visualizations is caused. In some implementations, the adjustable graphical user control can include a reverse playback element. When a user input is received via the reverse playback element, a reverse time-lapse display is caused. In the time-lapse display, the plurality of data visualizations are continuously updated as the specified time interval from 404 progresses forward in time. In reverse time-lapse display, the plurality of data visualizations are continuously updated as the specified time interval from 404 progresses backward in time.

In some implementations, a search is executed for each of the plurality of data visualizations displayed at 402. Each of the data visualizations are then visualizations of the respective search results. For example, each search can return a timestamped dataset, and the datasets returned by the searches can be different from each other. The data points used to generate the updated data visualizations at 406 are included in these search results.

System Overview

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 5:
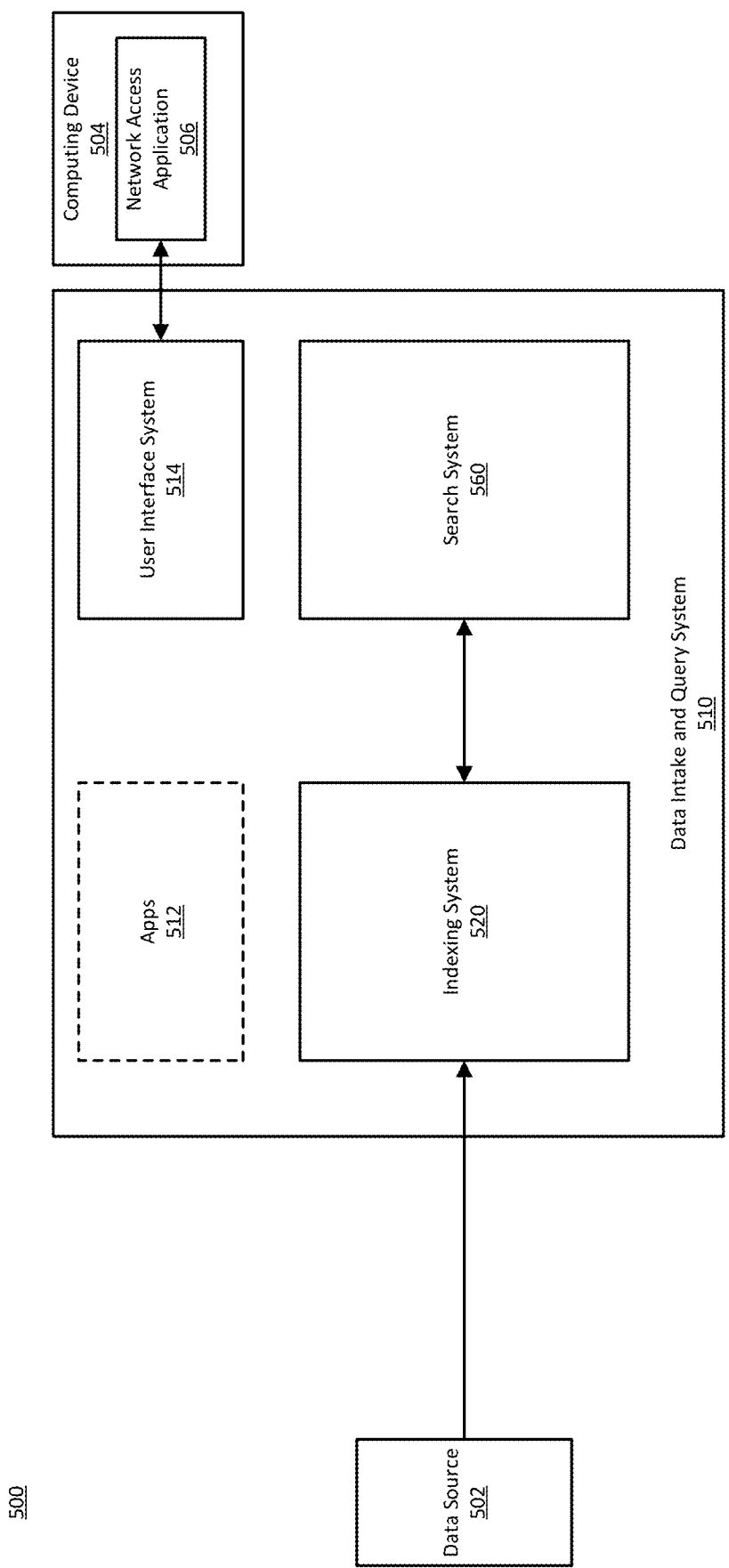
FIG. 5 is a block diagram illustrating an example computing environment that includes a data intake and query system.

FIG. 5 is a block diagram illustrating an example computing environment 500 that includes a data intake and query system 510. The data intake and query system 510 obtains data from a data source 502 in the computing environment 500, and ingests the data using an indexing system 520. A search system 560 of the data intake and query system 510 enables users to navigate the indexed data. Though drawn with separate boxes, in some implementations the indexing system 520 and the search system 560 can have overlapping components. A computing device 504, running a network access application 506, can communicate with the data intake and query system 510 through a user interface system 514 of the data intake and query system 510. Using the computing device 504, a user can perform various operations with respect to the data intake and query system 510, such as administration of the data intake and query system 510, management and generation of "knowledge objects," initiating of searches, and generation of reports, among other operations. The data intake and query system 510 can further optionally include apps 512 that extend the search, analytics, and/or visualization capabilities of the data intake and query system 510.

The data intake and query system 510 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 510 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 510 can execute on a single computing device, or may be distributed over multiple computing devices. For example, the program code can include instructions for executing both indexing and search components (which may be part of the indexing system 520 and/or the search system 560, respectively), and can be executed on a computing device that also provides the data source 502. As another example, the program code can execute on one computing device, where the program code executes both indexing and search components, while another copy of the program code executes on a second computing device that provides the data source 502. As another example, the program code can execute only an indexing component or only a search component. In this example, a first instance of the program code that is executing the indexing component and a second instance of the program code that is executing the search component can be executing on the same computing device or on different computing devices.

The data source 502 of the computing environment 500 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 502 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 520 obtains machine date from the data source 502 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 520 does not require prior knowledge of the structure of incoming data (e.g., the indexing system 520 does not need to be provided with a schema describing the data). Additionally, the indexing system 520 retains a copy of the data as it was received by the indexing system 520 such that the original data is always available for searching (e.g., no data is discarded, though, in some examples, the indexing system 520 can be configured to do so).

The search system 560 searches the data stored by the indexing system 520. As discussed in greater detail below, the search system 560 enables users associated with the computing environment 500 (and possibly also other users) to navigate the data, generate reports, and visualize results in "dashboards" output using a graphical interface. Using the facilities of the search system 560, users can obtain insights about the data, such as retrieving events from an index, calculating metrics, searching for specific conditions within a rolling time window, identifying patterns in the data, and predicting future trends, among other examples. To achieve greater efficiency, the search system 560 can apply map-reduce methods to parallelize searching of large volumes of data. Additionally, because the original data is available, the search system 560 can apply a schema to the data at search time. This allows different structures to be applied to the same data, or for the structure to be modified if or when the content of the data changes. Application of a schema at search time may be referred to herein as a late-binding schema technique.

The user interface system 514 provides mechanisms through which users associated with the computing environment 500 (and possibly others) can interact with the data intake and query system 510. These interactions can include configuration, administration, and management of the indexing system 520, initiation and/or scheduling of queries to the search system 560, receipt or reporting of search results, and/or visualization of search results. The user interface system 514 can include, for example, facilities to provide a command line interface or a web-based interface.

Users can access the user interface system 514 using a computing device 504 that communicates with data intake and query system 510, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 500. For example, a person can log in as a particular user and, using the user's digital information, can access the data intake and query system 510. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 504 can provide a human-machine interface through which a person can have a digital presence in the computing environment 500 in the form of a user. The computing device 504 is an electronic device having one or more processors and a memory capable of storing instructions for execution by the one or more processors. The computing device 504 can further include input/output (I/O) hardware and a network interface. Applications executed by the computing device 504 can include a network access application 506, which can a network interface of the client computing device 504 to communicate, over a network, with the user interface system 514 of the data intake and query system #A110. The user interface system 514 can use the network access application 506 to generate user interfaces that enable a user to interact with the data intake and query system #A110. A web browser is one example of a network access application. A shell tool can also be used as a network access application. In some examples, the data intake and query system 510 is an application executing on the computing device 504. In such examples, the network access application 506 can access the user interface system 514 without needed to go over a network.

The data intake and query system 510 can optionally include apps 512. An app of the data intake and query system 510 is a collection of configurations, knowledge objects (a user-defined entity that enriches the data in the data intake and query system 510), views, and dashboards that may provide additional functionality, different techniques for searching the data, and/or additional insights into the data. The data intake and query system 510 can execute multiple applications simultaneously. Example applications include an information technology service intelligence application, which can monitor and analyze the performance and behavior of the computing environment 500, and an enterprise security application, which can include content and searches to assist security analysts in diagnosing and acting on anomalous or malicious behavior in the computing environment 500.

Though FIG. 5 illustrates only one data source, in practical implementations, the computing environment 500 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 500, the data intake and query system 510 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 500 can include on-prem and cloud-based computing resources, or only cloud-based resources. For example, an entity may have on-prem computing devices and a private cloud. In this example, the entity operates the data intake and query system 510 and can choose to execute the data intake and query system 510 on an on-prem computing device or in the cloud. In another example, a provider entity operates the data intake and query system 510 in a public cloud and provides the functionality of the data intake and query system 510 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 510. In some implementations, the entity providing the data intake and query system 510 is itself subscribing to the cloud services of a cloud service provider. As an example, a first entity provides computing resources under a public cloud service model, a second entity subscribes to the cloud services of the first provider entity and uses the cloud computing resources to operate the data intake and query system 510, and a third entity can subscribe to the services of the second provider entity in order to use the functionality of the data intake and query system 510. In this example, the data sources are associated with the third entity, users accessing the data intake and query system 510 are associated with the third entity, and the analytics and insights provided by the data intake and query system 510 are for purposes of the third entity's operations.

Figure 6:
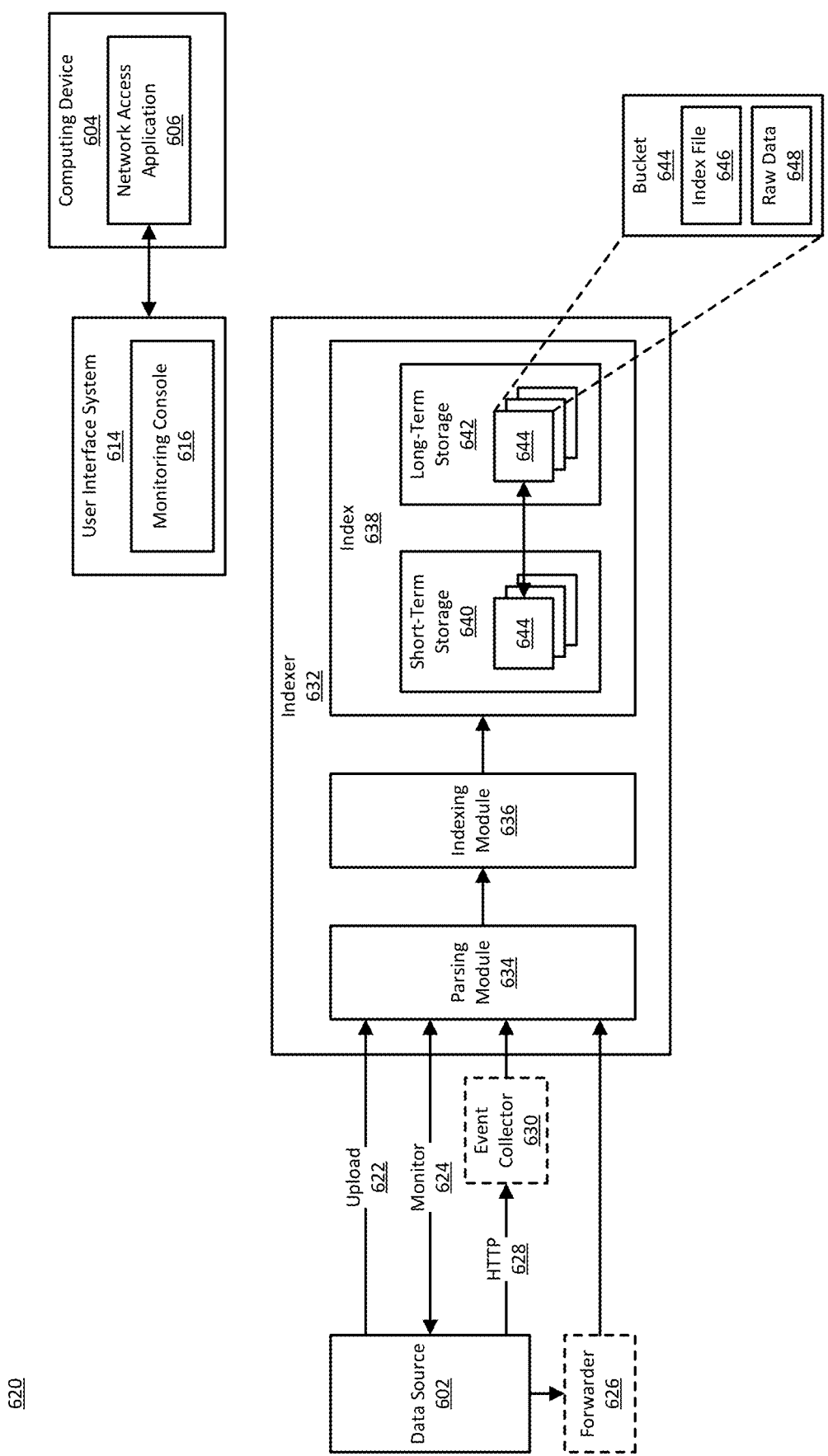
FIG. 6 is a block diagram illustrating an example of an indexing system of a data intake and query system.

FIG. 6 is a block diagram illustrating in greater detail an example of an indexing system 620 of a data intake and query system, such as the data intake and query system 510 of FIG. 5. The indexing system 620 of FIG. 6 uses various methods to obtain machine data from a data source 602 and stores the data in an index 638 of an indexer 632. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 620 enables the data intake and query system to obtain the machine data produced by the data source 602 and to store the data for searching and retrieval.

Users can administer the operations of the indexing system 620 using a computing device 604 that can access the indexing system 620 through a user interface system 614 of the data intake and query system. For example, the computing device 604 can be executing a network access application 606, such as a web browser or a terminal, through which a user can access a monitoring console 616 provided by the user interface system 614. The monitoring console 616 can enable operations such as: identifying the data source 602 for indexing; configuring the indexer 632 to index the data from the data source 602; configuring a data ingestion method; configuring, deploying, and managing clusters of indexers; and viewing the topology and performance of a deployment of the data intake and query system, among other operations. The operations performed by the indexing system 620 may be referred to as "index time" operations, which are distinct from "search time" operations that are discussed further below.

The indexer 632, which may be referred to herein as a data indexing component, coordinates and performs most of the index time operations. The indexer 632 can be implemented using program code that can be executed on a computing device. The program code for the indexer 632 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 632. In some implementations, the indexer 632 executes on the computing device 604 through which a user can access the indexing system 620. In some implementations, the indexer 632 executes on a different computing device.

The indexer 632 may be executing on the computing device that also provides the data source 602 or may be executing on a different computing device. In implementations wherein the indexer 632 is on the same computing device as the data source 602, the data produced by the data source 602 may be referred to as "local data." In other implementations the data source 602 is a component of a first computing device and the indexer 632 executes on a second computing device that is different from the first computing device. In these implementations, the data produced by the data source 602 may be referred to as "remote data." In some implementations, the first computing device is "on-prem" and in some implementations the first computing device is "in the cloud." In some implementations, the indexer 632 executes on a computing device in the cloud and the operations of the indexer 632 are provided as a service to entities that subscribe to the services provided by the data intake and query system.

For a given data produced by the data source 602, the indexing system 620 can be configured to use one of several methods to ingest the data into the indexer 632. These methods include upload 622, monitor 624, using a forwarder 626, or using HyperText Transfer Protocol (HTTP 628) and an event collector 630. These and other methods for data ingestion may be referred to as "getting data in" (GDI) methods.

Using the upload 622 method, a user can instruct the indexing system to 602 to specify a file for uploading into the indexer 632. For example, the monitoring console 616 can include commands or an interface through which the user can specify where the file is located (e.g., on which computing device and/or in which directory of a file system) and the name of the file. Once uploading is initiated, the indexer 632 processes the file, as discussed further below. Uploading is a manual process and occurs when instigated by a user. For automated data ingestion, the other ingestion methods are used.

The monitor 624 method enables the indexing system 620 to monitor the data source 602 and continuously or periodically obtain data produced by the data source 602 for ingestion by the indexer 632. For example, using the monitoring console 616, a user can specify a file or directory for monitoring. In this example, the indexing system 620 can execute a monitoring process that detects whenever data is added to the file or directory and causes the data to be sent to the indexer 632. As another example, a user can specify a network port for monitoring. In this example, a monitoring process can capture data received at or transmitting from the network port and cause the data to be sent to the indexer 632. In various examples, monitoring can also be configured for data sources such as operating system event logs, performance data generated by an operating system, operating system registries, operating system directory services, and other data sources.

Monitoring is available when the data source 602 is local to the indexer 632 (e.g., the data source 602 is on the computing device where the indexer 632 is executing). Other data ingestion methods, including forwarding and the event collector 630, can be used for either local or remote data sources.

A forwarder 626, which may be referred to herein as a data forwarding component, is a software process that sends data from the data source 602 to the indexer 632. The forwarder 626 can be implemented using program code that can be executed on the computer device that provides the data source 602. A user launches the program code for the forwarder 626 on the computing device that provides the data source 602. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 626 can provide various capabilities. For example, the forwarder 626 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 626 can break the data into individual events (event generation is discussed further below) and send the events to a receiver. Other operations that the forwarder 626 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 630 provides an alternate method for obtaining data from the data source 602. The event collector 630 enables data and application events to be sent to the indexer 632 using HTTP 628. The event collector 630 can be implemented using program code that can be executing on a computing device. The program code may be a component of the data intake and query system or can be a standalone component that can be executed independently of the data intake and query system and operates in cooperation with the data intake and query system.

To use the event collector 630, a user can, for example using the monitoring console 616 or a similar interface provided by the user interface system 614, enable the event collector 630 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 602 as an alternative method to using a username and password for authentication.

To send data to the event collector 630, the data source 602 is supplied with a token and can then send HTTP 628 requests to the event collector 630. To send HTTP 628 requests, the data source 602 can be configured to use an HTTP client and/or to use logging libraries such as those supplied by Java, JavaScript, and .NET libraries. An HTTP client enables the data source 602 to send data to the event collector 630 by supplying the data, and a Uniform Resource Identifier (URI) for the event collector 630 to the HTTP client. The HTTP client then handles establishing a connection with the event collector 630, transmitting a request containing the data, closing the connection, and receiving an acknowledgment if the event collector 630 sends one. Logging libraries enable HTTP 628 requests to the event collector 630 to be generated directly by the data source. For example, an application can include or link a logging library, and through functionality provided by the logging library manage establishing a connection with the event collector 630, transmitting a request, and receiving an acknowledgement.

An HTTP 628 request to the event collector 630 can contain a token, a channel identifier, event metadata, and/or event data. The token authenticates the request with the event collector 630. The channel identifier, if available in the indexing system 620, enables the event collector 630 to segregate and keep separate data from different data sources. The event metadata can include one or more key-value pairs that describe the data source 602 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 630 extracts events from HTTP 628 requests and sends the events to the indexer 632. The event collector 630 can further be configured to send events or event data to one or more indexers. Extracting the events can include associating any metadata in a request with the event or events included in the request. In these implementations, event generation by the indexer 632 (discussed further below) is bypassed, and the indexer 632 moves the events directly to indexing. In some implementations, the event collector 630 extracts event data from a request and outputs the event data to the indexer 632, and the indexer generates events from the event data. In some implementations, the event collector 630 sends an acknowledgement message to the data source 602 to indicate that the event collector 630 has received a particular request form the data source 602, and/or to indicate to the data source 602 that events in the request have been added to an index.

The indexer 632 ingests incoming data and transforms the data into searchable knowledge in the form of events. In the data intake and query system, an event is a single piece of data that represents activity of the component represented in FIG. 6 by the data source 602. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 632 can include a parsing module 634 and an indexing module 636 for generating and storing the events. The parsing module 634 and indexing module 636 can be modular and pipelined, such that one component can be operating on a first set of data while the second component is simultaneously operating on a second sent of data. Additionally, the indexer 632 may at any time have multiple instances of the parsing module 634 and indexing module 636, with each set of instances configured to simultaneously operate on data from the same data source or from different data sources. The parsing module 634 and indexing module 636 are illustrated to facilitate discussion, with the understanding that implementations with other components are possible to achieve the same functionality.

The parsing module 634 determines information about event data, where the information can be used to identify events within the event data. For example, the parsing module 634 can associate a source type with the event data. A source type identifies the data source 602 and describes a possible data structure of event data produced by the data source 602. For example, the source type can indicate which fields to expect in events generated at the data source 602 and the keys for the values in the fields, and possibly other information such as sizes of fields, an order of the fields, a field separator, and so on. The source type of the data source 602 can be specified when the data source 602 is configured as a source of event data. Alternatively, the parsing module 634 can determine the source type from the event data, for example from an event field or using machine learning.

Other information that the parsing module 634 can determine includes timestamps. In some cases, an event includes a timestamp as a field, and the timestamp indicates a point in time when the action represented by the event occurred or was recorded by the data source 602 as event data. In these cases, the parsing module 634 may be able to determine from the source type associated with the event data that the timestamps can be extracted from the events themselves. In some cases, an event does not include a timestamp and the parsing module 634 determines a timestamp for the event, for example from a name associated with the event data from the data source 602 (e.g., a file name when the event data is in the form of a file) or a time associated with the event data (e.g., a file modification time). As another example, when the parsing module 634 is not able to determine a timestamp from the event data, the parsing module 634 may use the time at which it is indexing the event data. As another example, the parsing module 634 can use a user-configured rule to determine the timestamps to associate with events.

The parsing module 634 can further determine event boundaries. In some cases, a single line (e.g., a sequence of characters ending with a line termination) in event data represents one event while in other cases, a single line represents multiple events. In yet other cases, one event may span multiple lines within the event data. The parsing module 634 may be able to determine event boundaries from the source type associated with the event data, for example from a data structure indicated by the source type. In some implementations, a user can configure rules the parsing module 634 can use to identify event boundaries.

The parsing module 634 can further extract data from events and possibly also perform transformations on the events. For example, the parsing module 634 can extract a set of fields for each event, such as a host or hostname, source or source name, and/or source type. The parsing module 634 may extract certain fields by default or based on a user configuration. Alternatively or additionally, the parsing module 634 may add fields to events, such as a source type or a user-configured field. As another example of a transformation, the parsing module 634 can anonymize fields in events to mask sensitive information, such as social security numbers or account numbers. Anonymizing fields can include changing or replacing values of specific fields. The parsing module 634 can further perform user-configured transformations.

The parsing module 634 outputs the results of processing incoming event data to the indexing module 636, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 632 can be configured to identify searchable segments that are parts of fields, searchable segments that are entire fields, or both. The parsing module 634 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 646, to find event data that matches a search query. In some implementations, segmentation can alternatively be performed by the forwarder 626. Segmentation can also be disabled, in which case the indexer 632 will not build a lexicon for the event data. When segmentation is disabled, the search system searches the event data directly.

Building index data structures generates the index 638. The index 638 is a storage data structure on a storage device (e.g., a disk drive or other physical device for storing digital data). The storage device may be a component of the computing device on which the indexer 632 is operating (referred to herein as local storage) or may be a component of a different computing device (referred to herein as remote storage) that the indexer 632 has access to over a network. The indexer 632 can include more than one index and can include indexes of different types. For example, the indexer 632 can include event indexes, which impose minimal structure on stored data and can accommodate any type of data. As another example, the indexer 632 can include metrics indexes, which use a highly structured format to handle the higher volume and lower latency demands associated with metrics data.

The indexing module 636 organizes files in the index 638 in directories referred to as buckets. The files in a bucket 644 can include raw data files, index files, and possibly also other metadata files. As used herein, "raw data" means data as when the data was produced by the data source 602, without alteration to the format or content. As noted previously, the parsing module 634 may add fields to event data and/or perform transformations on fields in the event data, and thus a raw data file 648 can include, in addition to or instead of raw data, what is referred to herein as enriched raw data. The raw data file 648 may be compressed to reduce disk usage. An index file 646, which may also be referred to herein as a "time-series index" or tsidx file, contains metadata that the indexer 632 can use to search a corresponding raw data file 648. As noted above, the metadata in the index file 646 includes a lexicon of the event data, which associates each unique keyword in the event data in the raw data file 648 with a reference to the location of event data within the raw data file 648. The keyword data in the index file 646 may also be referred to as an inverted index. In various implementations, the data intake and query system can use index files for other purposes, such as to store data summarizations that can be used to accelerate searches.

A bucket 644 includes event data for a particular time range. The indexing module 636 arranges buckets in the index 638 according to the age of the buckets, such that buckets for more recent ranges of time are stored in short-term storage 640 and buckets for less recent ranges of time are stored in long-term storage 642. Short-term storage 640 may be faster to access while long-term storage 642 may be slower to access. Buckets may move from short-term storage 640 to long-term storage 642 according to a configurable data retention policy, which can indicate at what point in time a bucket is old enough to be moved.

A bucket's location in short-term storage 640 or long-term storage 642 can also be indicated by the bucket's status. As an example, a bucket's status can be "hot," "warm," "cold," "frozen," or "thawed." In this example, hot bucket is one to which the indexer 632 is writing data and the bucket becomes a warm bucket when the indexer 632 stops writing data to it. In this example, both hot and warm buckets reside in short-term storage 640. Continuing this example, when a warm bucket is moved to long-term storage 642, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 620 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 620 through the monitoring console 616 provided by the user interface system 614. Using the monitoring console 616, the user can configure and monitor an index cluster, and see information such as disk usage by an index, volume usage by an indexer, index and volume size over time, data age, statistics for bucket types, and bucket settings, among other information.

Figure 7:
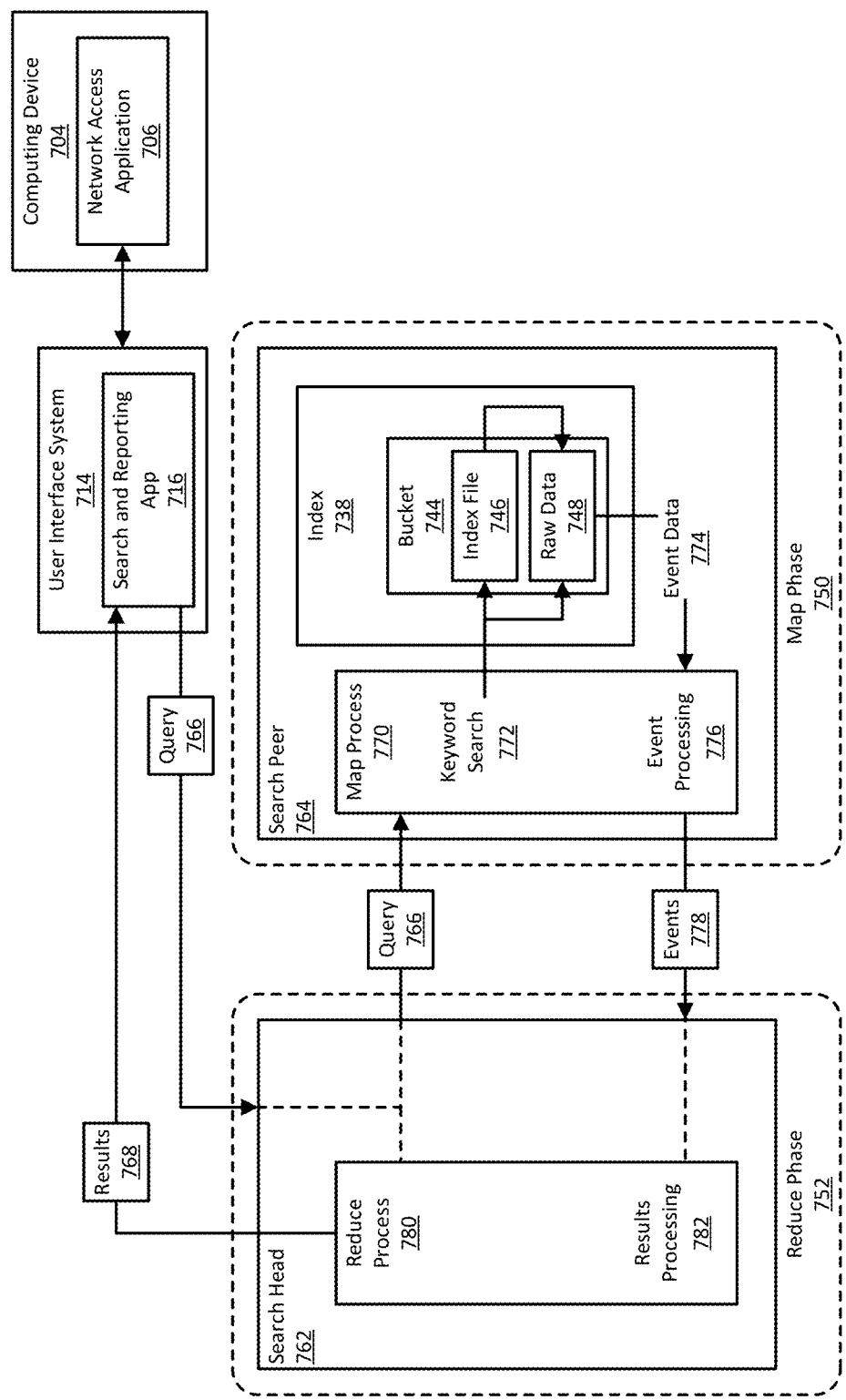
FIG. 7 is a block diagram illustrating an example of a search system of a data intake and query system.

FIG. 7 is a block diagram illustrating in greater detail an example of the search system 760 of a data intake and query system, such as the data intake and query system 510 of FIG. 5. The search system 760 of FIG. 7 issues a query 766 to a search head 762, which sends the query 766 to a search peer 764. Using a map process 770, the search peer 764 searches the appropriate index 738 for events identified by the query 766 and sends events 778 so identified back to the search head 762. Using a reduce process 780, the search head 762 processes the events 778 and produces results 768 to respond to the query 766. The results 768 can provide useful insights about the data stored in the index 738. These insights can aid in the administration of information technology systems, in security analysis of information technology systems, and/or in analysis of the development environment provided by information technology systems.

The query 766 that initiates a search is produced by a search and reporting app 716 that is available through the user interface system 714 of the data intake and query system. Using a network access application 706 executing on a computing device 704, a user can input the query 766 into a search field provided by the search and reporting app 716. Alternatively or additionally, the search and reporting app 716 can include pre-configured queries or stored queries that can be activated by the user. In some cases, the search and reporting app 716 initiates the query 766 when the user enters the query 766. In these cases, the query 766 maybe referred to as an "ad-hoc" query. In some cases, the search and reporting app 716 initiates the query 766 based on a schedule. For example, the search and reporting app 716 can be configured to execute the query 766 once per hour, once per day, at a specific time, on a specific date, or at some other time that can be specified by a date, time, and/or frequency. These types of queries maybe referred to as scheduled queries.

The query 766 is specified using a search processing language. The search processing language includes commands that the search peer 764 will use to identify events to return in the search results 768. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 766 to include sequential commands, where a subsequent command may operate on the results of a prior command. As an example, sequential commands may be separated in the query 766 by a vertical line ("|" or "pipe") symbol.

In addition to one or more search commands, the query 766 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a time range (e.g., the last 24 hours), in which case only events whose timestamps fall within the time range will be searched. The time indicator can alternatively indicate all of time, in which case all events will be searched.

Processing of the search query 766 occurs in two broad phases: a map phase 750 and a reduce phase 752. The map phase 750 takes place across one or more search peers. In the map phase 750, the search peers locate event data that matches the search terms in the search query 766 and sorts the event data into field-value pairs. When the map phase 750 is complete, the search peers send events that they have found to one or more search heads for the reduce phase 752. During the reduce phase 752, the search heads process the events through commands in the search query 766 and aggregate the events to produce the final search results 768.

A search head, such as the search head 762 illustrated in FIG. 7, is a component of the search system 760 that manages searches. The search head 762, which may also be referred to herein as a search management component, can be implemented using program code that can be executed on a computing device. The program code for the search head 762 can be stored on a non-transitory computer-readable medium and from this medium can be loaded or copied to the memory of a computing device. One or more hardware processors of the computing device can read the program code from the memory and execute the program code in order to implement the operations of the search head 762.

Upon receiving the search query 766, the search head 762 directs the query 766 to one or more search peers, such as the search peer 764 illustrated in FIG. 7. "Search peer" is an alternate name for "indexer" and a search peer may be largely similar to the indexer described previously. The search peer 764 may be referred to as a "peer node" when the search peer 764 is part of an indexer cluster. The search peer 764, which may also be referred to as a search execution component, can be implemented using program code that can be executed on a computing device. In some implementations, one set of program code implements both the search head 762 and the search peer 764 such that the search head 762 and the search peer 764 form one component. In some implementations, the search head 762 is an independent piece of code that performs searching and no indexing functionality. In these implementations, the search head 762 may be referred to as a dedicated search head.

The search head 762 may consider multiple criteria when determining whether to send the query 766 to the particular search peer 764. For example, the search system 760 may be configured to include multiple search peers that each have duplicative copies of at least some of the event data. In this example, the sending the search query 766 to more than one search peer allows the search system 760 to distribute the search workload across different hardware resources. As another example, search system 760 may include different search peers for different purposes (e.g., one has an index storing a first type of data or from a first data source while a second has an index storing a second type of data or from a second data source). In this example, the search query 766 may specify which indexes to search, and the search head 762 will send the query 766 to the search peers that have those indexes.

To identify events 778 to send back to the search head 762, the search peer 764 performs a map process 770 to obtain event data 774 from the index 738 that is maintained by the search peer 764. During a first phase of the map process 770, the search peer 764 identifies buckets that have events that are described by the time indicator in the search query 766. As noted above, a bucket contains events whose timestamps fall within a particular time range. For each bucket 744 whose events can be described by the time indicator, during a second phase of the map process 770, the search peer 764 performs a keyword search 772 using search terms specified in the search query 766. The search terms can be one or more of keywords, phrases, fields, Boolean expressions, and/or comparison expressions that in combination describe events being searched for. When segmentation is enabled at index time, the search peer 764 performs the keyword search 772 on the bucket's index file 746. As noted previously, the index file 746 includes a lexicon of the searchable terms in the events stored in the bucket's raw data 748 file. The keyword search 772 searches the lexicon for searchable terms that correspond to one or more of the search terms in the query 766. As also noted above, the lexicon incudes, for each searchable term, a reference to each location in the raw data 748 file where the searchable term can be found. Thus, when the keyword search identifies a searchable term in the index file 746 that matches query 766, the search peer 764 can use the location references to extract from the raw data 748 file the event data 774 for each event that include the searchable term.

In cases where segmentation was disabled at index time, the search peer 764 performs the keyword search 772 directly on the raw data 748 file. To search the raw data 748, the search peer 764 may identify searchable segments in events in a similar manner as when the data was indexed. Thus, depending on how the search peer 764 is configured, the search peer 764 may look at event fields and/or parts of event fields to determine whether an event matches the query 766. Any matching events can be added to the event data #A74 read from the raw data 748 file. The search peer 764 can further be configured to enable segmentation at search time, so that searching of the index 738 causes the search peer 764 to build a lexicon in the index file 746.

The event data 774 obtained from the raw data 748 file includes the full text of each event found by the keyword search 772. During a third phase of the map process 770, the search peer 764 performs event processing 776 on the event data 774, with the steps performed being determined by the configuration of the search peer 764 and/or commands in the search query 766. For example, the search peer 764 can be configured to perform field discovery and field extraction. Field discovery is a process by which the search peer 764 identifies and extracts key-value pairs from the events in the event data 774. The search peer 764 can, for example, be configured to automatically extract the first 100 fields (or another number of fields) in the event data 774 that can be identified as key-value pairs. As another example, the search peer 764 can extract any fields explicitly mentioned in the search query 766. The search peer 764 can, alternatively or additionally, be configured with particular field extractions to perform.

Other examples of steps that can be performed during event processing 776 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 764 sends processed events 778 to the search head 762, which performs a reduce process 780. The reduce process 780 potentially receives events from multiple search peers and performs various results processing 782 steps on the events. The results processing 782 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 782 can further include applying commands from the search query 766 to the events. The query 766 can include, for example, commands for evaluating and/or manipulating fields (e.g., to generate new fields from existing fields or parse fields that have more than one value). As another example, the query 766 can include commands for calculating statistics over the events, such as counts of the occurrences of fields, or sums, averages, ranges, and so on, of field values. As another example, the query 766 can include commands for generating statistical values for purposes of generating charts of graphs of the events.

Through results processing 782, the reduce process 780 produces the events found by processing the search query 766, as well as some information about the events, which the search head 762 outputs to the search and reporting app 716 as search results 768. The search and reporting app 716 can generate visual interfaces for viewing the search results 768. The search and reporting app 716 can, for example, output visual interfaces for the network access application 706 running on a computing device 704 to generate.

The visual interfaces can include various visualizations of the search results 768, such as tables, line or area charts, Chloropleth maps, or single values. The search and reporting app 716 can organize the visualizations into a dashboard, where the dashboard includes a panel for each visualization. A dashboard can thus include, for example, a panel listing the raw event data for the events in the search results 768, a panel listing fields extracted at index time and/or found through field discovery along with statistics for those fields, and/or a timeline chart indicating how many events occurred at specific points in time (as indicated by the timestamps associated with each event). In various implementations, the search and reporting app 716 can provide one or more default dashboards. Alternatively or additionally, the search and reporting app 716 can include functionality that enables a user to configure custom dashboards.

The search and reporting app 716 can also enable further investigation into the events in the search results 768. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 766. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   receiving, via a first graphical user interface (GUI), a selection from a user indicating a range start and a range end;
   generating a customized link to an interactive GUI based on the range start and the range end;
   in response to a user selection of the customized link, causing, by a computer system, display of the interactive GUI, so that the interactive GUI concurrently includes a plurality of data visualizations and an adjustable graphical user control for specifying a time interval, wherein each data visualization of the plurality of data visualizations is a graph, plot or chart;
   receiving, by the computer system, a user input specifying the time interval via the adjustable graphical user control; and
   updating, by the computer system, each data visualization of the plurality of data visualizations in real-time automatically in response to the user input specifying the time interval, wherein the plurality of updated data visualizations are generated using data points associated with time values within the time interval.

2. The method of claim 1, wherein the adjustable graphical user control includes a first element that is movable to select a beginning of the time interval and a second element that is movable to select an end of the time interval.

3. The method of claim 1, wherein the adjustable graphical user control includes a first element that is slidable to select a beginning of the time interval and a second element that is slidable to select an end of the time interval.

4. The method of claim 1, further comprising:
prior to causing display of the interactive GUI, receiving a selection indicating the range start and the range end; and
configuring the adjustable graphical user control based on the range start and the range end.

5. The method of claim 1, wherein the adjustable graphical user control includes a playback element, the method further comprising:
receiving a second user input via the playback element, and
causing a time-lapse display of the plurality of data visualizations.

6. The method of claim 1, wherein the adjustable graphical user control includes a reverse playback element, the method further comprising:
receiving a second user input via the reverse playback element; and
causing a reverse time-lapse display of the plurality of data visualizations.

7. The method of claim 1, wherein said causing display of the interactive GUI includes:
for each of the plurality of data visualizations, executing a search to generate respective sets of search results,
wherein each of the plurality of data visualizations is a visualization of the respective set of search results.

8. The method of claim 1, further comprising:
prior to causing display of the interactive GUI, executing a search for each of the plurality of data visualizations to generate respective sets of search results,
wherein each of the plurality of data visualizations is a visualization of the respective set of search results, and
wherein the data points associated with time values within the time interval are included in the sets of search results.

9. The method of claim 1, wherein the plurality of data visualizations include at least one of: a bar chart, a pie chart, a line graph, a scatter plot, a bubble chart, a table, a scalable vector graphics object, or a single value visualization.

10. A computing device comprising:
a processor; and
a non-transitory computer-readable medium storing instructions, execution of which by the processor causes the computing device to perform operations including:
receiving, via a first graphical user interface (GUI), a selection from a user indicating a range start and a range end;
generating a customized link to an interactive GUI based on the range start and the range end;
in response to a user selection of the customized link, causing display of the interactive GUI so that the interactive GUI concurrently includes a plurality of data visualizations and an adjustable graphical user control for specifying a time interval, wherein each data visualization of the plurality of data visualizations is a graph, plot or chart;
receiving a user input specifying the time interval via the adjustable graphical user control; and
updating each data visualization of the plurality of data visualizations in real-time automatically in response to the user input specifying the time interval, wherein the plurality of updated data visualizations are generated using data points associated with time values within the time interval.

11. The computing device of claim 10, wherein the adjustable graphical user control includes a first element that is movable to select a beginning of the time interval and a second element that is movable to select an end of the time interval.

12. The computing device of claim 10, wherein the adjustable graphical user control includes a playback element, and wherein the computing device is further caused to perform operations including:
receiving a second user input via the playback element, and
causing a time-lapse display of the plurality of data visualizations.

13. The computing device of claim 10, wherein said causing display of the GUI includes:
for each of the plurality of data visualizations, executing a search to generate respective search results,
wherein each data visualization is a visualization of the respective search results.

14. A non-transitory computer-readable medium storing instructions, execution of which by one or more processors in a processing system causes the processing system to perform operations including:
receiving, via a first graphical user interface (GUI), a selection from a user indicating a range start and a range end;
generating a customized link to an interactive GUI based on the range start and the range end;
in response to a user selection of the customized link, causing, by a computer system, display of the interactive GUI so that the interactive GUI concurrently includes a plurality of data visualizations and an adjustable graphical user control for specifying a time interval, wherein each data visualization of the plurality of data visualizations is a graph, plot or chart;
receiving, by the computer system, a user input specifying the time interval via the adjustable graphical user control; and
updating, by the computer system, each data visualization of the plurality of data visualizations in real-time automatically in response to completion of the user input specifying the time interval, wherein the plurality of updated data visualizations are generated using data points associated with time values within the time interval.

15. The non-transitory computer-readable medium of claim 14, wherein the adjustable graphical user control includes a first element movable to select a beginning of the time interval and a second element movable to select an end of the time interval.

16. The non-transitory computer-readable medium of claim 14, wherein the adjustable graphical user control includes a playback element, and wherein the processing system is further caused to perform operations including:
receiving a second user input via the playback element, and
causing a time-lapse display of the plurality of data visualizations.

17. The non-transitory computer-readable medium of claim 14, wherein the processing system is further caused to perform operations including:
prior to causing display of the GUI, receiving a selection indicating a playback interval; and
causing a time-lapse display of the plurality of data visualizations that proceeds at a rate corresponding to the playback interval.

* * * * *